United States Patent
Mildh et al.

(10) Patent No.: US 11,310,725 B2
(45) Date of Patent: Apr. 19, 2022

(54) RESOLVING SYSTEM INFORMATION BETWEEN EPS AND 5GS

(71) Applicant: TELEFONAKTIEBOLAGET LM ERICSSON (PUBL), Stockholm (SE)

(72) Inventors: Gunnar Mildh, Sollentuna (SE); Matteo Fiorani, Solna (SE); Paul Schliwa-Bertling, Ljungsbro (SE); Kai-Erik Sunell, Antibes (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 115 days.

(21) Appl. No.: 16/483,434

(22) PCT Filed: Jan. 31, 2018

(86) PCT No.: PCT/IB2018/050607
§ 371 (c)(1),
(2) Date: Aug. 5, 2019

(87) PCT Pub. No.: WO2018/142303
PCT Pub. Date: Aug. 9, 2018

(65) Prior Publication Data
US 2019/0357125 A1  Nov. 21, 2019

Related U.S. Application Data

(60) Provisional application No. 62/454,710, filed on Feb. 3, 2017.

(51) Int. Cl.
*H04W 48/16* (2009.01)
*H04W 48/12* (2009.01)
(Continued)

(52) U.S. Cl.
CPC ........... *H04W 48/16* (2013.01); *H04W 48/12* (2013.01); *H04W 48/18* (2013.01); *H04W 84/042* (2013.01); *H04W 88/06* (2013.01)

(58) Field of Classification Search
CPC ..... H04W 48/16; H04W 48/12; H04W 88/06; H04W 84/042; H04W 48/18
See application file for complete search history.

(56) References Cited

U.S. PATENT DOCUMENTS

2007/0161373 A1    7/2007  Klatt
2010/0278064 A1*  11/2010  Jeong ................. H04W 74/008
                                                    370/252
(Continued)

FOREIGN PATENT DOCUMENTS

CN    107734592 A    2/2018
EP      1096728 A2   5/2001
(Continued)

OTHER PUBLICATIONS

Ericsson, Barring legacy UEs from 5GC only cells, Tdoc R2-01713270, 3GPP TSG-RAN WG2 #100, Reno, Nevada, USA, Nov. 27-Dec. 1, 2017.

(Continued)

*Primary Examiner* — Angel T Brockman (57) ABSTRACT

According to some embodiments, a method for use in a wireless device of acquiring system information associated with a core network comprises receiving system information from a network node. The network node is connected to one or more core networks. The system information includes an indication of a network type (e.g., enhanced packet system (EPS), fifth generation system (5GS), etc.) for each core network. The method further comprises determining a capability of the wireless device for connecting to the plurality of network types, and determining whether to connect to a core network based on the network type and the capability of the wireless device. In particular embodiments, the indication of the network type comprises a list of public land mobile (Continued)

300

| 312: receive system information from a network node, the system information including an indication of a network type for one or more core networks |

↓

| 314: determine a capability of a wireless device for connecting to a plurality of network types |

↓

| 316: determine whether to connect to a core network based on the network type of the core network and the capability of the wireless device | networks (PLMNs) connected to the network node and an indication of network types supported by each PLMN.

34 Claims, 7 Drawing Sheets

(51) Int. Cl.
*H04W 48/18* (2009.01)
*H04W 84/04* (2009.01)
*H04W 88/06* (2009.01)

(56) References Cited

U.S. PATENT DOCUMENTS

| 2014/0315554 A1 | 10/2014 | Hapsari et al. |
| 2018/0077637 A1 | 3/2018 | Basilier et al. |

FOREIGN PATENT DOCUMENTS

| EP | 1104975 | A2 | 6/2001 |
| EP | 3528550 | A1 | 8/2019 |
| WO | 2016162467 | A1 | 10/2016 |
| WO | 2017171427 | A1 | 10/2017 |

OTHER PUBLICATIONS

Qualcomm Incorporated, Preventing Legacy LTE UEs from camping on eLTE cells & PLMNs connected to new 5G Core Network only, R2-1712264, 3GPP TSG-RAN Meeting #100, Reno, USA, Nov. 27-Dec. 1, 2017.

Qualcomm Incorporated, et al., "Way forward on migration from option 3 to NG Core," S2-165668, SA WG2 Meeting #116bis, Kaohsiung, Taiwan, Oct. 17-21, 2016.

3GPP, "3rd Generation Partnership Project; Technical Specification Group Services and System Aspects; Study on Architecture for Next Generation System (Release 14)", TR 23.799 V1.1.0, Oct. 2016.

CATT, "Consideration on the evolution path of interface between LTE and NR," R3-161692, 3GPP TSG RAN WG3 Meeting #93, Gothenburg, Sweden, Aug. 22-26, 2016.

Huawei, et al., "Solution for enhanced dedicated core network selection," S2-153307, SA WG2 Meeting #111, Chengdu, China, Oct. 19-23, 2015.

* cited by examiner

RESOLVING SYSTEM INFORMATION BETWEEN EPS AND 5GS

This application is a 371 of International Application No. PCT/IB2018/050607, filed Jan. 31, 2018, which claims the benefit of U.S. Application No. 62/454,710, filed Feb. 3, 2017, the disclosures of which are fully incorporated herein by reference.

TECHNICAL FIELD

Certain embodiments of the present disclosure relate, in general, to wireless communications and, more particularly, to resolving ambiguity in system information (SI) broadcast in cells that support one or more of Third Generation Partnership Project (3GPP) evolved packet system (EPS) and fifth generation system (5GS) core networks.

INTRODUCTION

The standardization organization Third Generation Partnership Project (3GPP) is currently specifying a new radio interface referred to as new radio (NR), fifth generation (5G), 5G-NR, or next generation universal terrestrial radio access (G-UTRA), as well as a next generation packet core network (NG-CN, NGC, 5GC, or 5G-CN). Below is a brief description based on 3GPP TS 23.799 v1.1.0 (incorporated herein by reference), which includes a high-level architecture for a next generation system (NGS).

Figure 1:
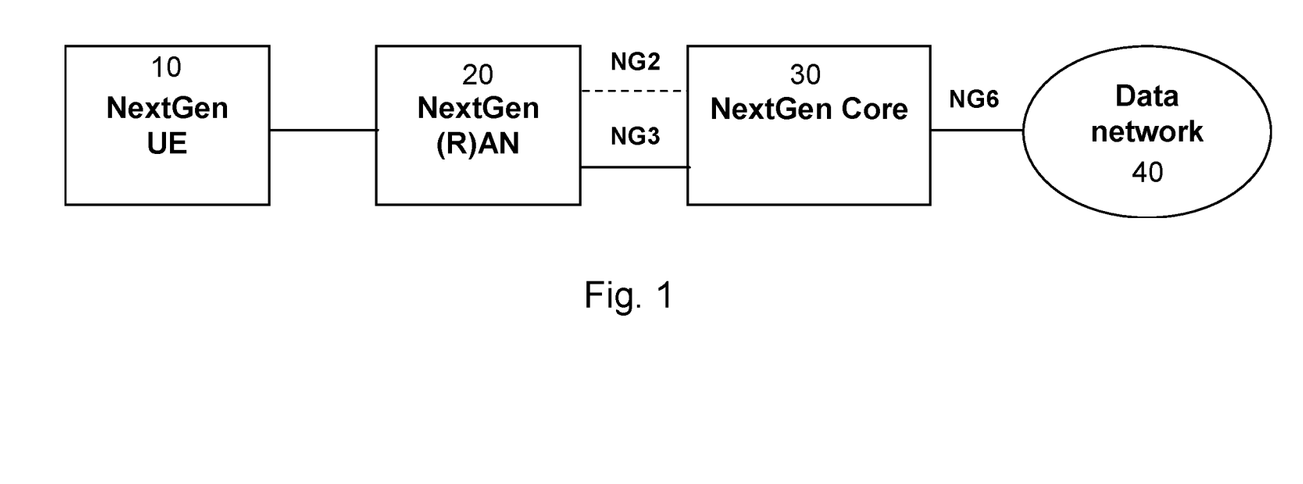
FIG. 1 is a block diagram illustrating a high level architecture of a 5G system.

FIG. 1 is a block diagram illustrating a high level architecture of a 5G system. The illustrated architecture may be used as a reference model for processes described herein. FIG. 1 includes next generation user equipment (UE) 10, next generation radio access network (RAN) 20, next generation core network 30 and their reference points. Next generation RAN 20 (also referred to as 5G-RAN) may include different radio base stations (e.g., long term evolution (LTE) eNBs and NR gNB).

Next generation UE 10 is coupled to a next generation RAN 20. Next generation RAN 20 is coupled over a communication path NG2 or NG3 to next generation CN 30 that in turn is coupled to data network 40, such as the Internet. NG1 represents a reference point for the control plane between next-generation UE 10 and next-generation CN 30. NG2 represents a reference point for the control plane between next generation RAN 20 and next generation CN 30. NG3 represents a reference point for the user plane between next generation RAN 20 and next generation CN 30. NG6 represents a reference point between next generation CN 30 and data network 40. Data network 40 may be an operator external public or private data network or an intra-operator data network (e.g., for provision of IP Multimedia Subsystem (IMS) services. NG6 corresponds to SGi for 3GPP accesses. SGi is the reference point for the interface between the packet data network (PDN) gateway (GW) and the packet data network (PDN).

Network deployments based on different 3GPP core networks (e.g., EPC-based and 5GC-based) and UEs with different capabilities (e.g., EPC-NAS and 5GC-NAS) may coexist at the same time within one public land mobile network (PLMN). An example is described in the 3GPP submission S2-170673, entitled "Migration-Architecture," Qualcomm Inc., SA2#118bis, which is incorporated herein by reference. A UE that is capable of supporting 5GC-NAS procedures may also be capable of supporting EPC-NAS procedures. Therefore, UEs that are capable only of EPC-NAS must be connected to EPC, while UEs that are capable of 5GC-NAS can be connected either to EPC or 5GC.

A LTE eNB can belong to multiple PLMNs (e.g., for RAN network sharing). For each PLMN, the LTE eNB can be connected to: (1) EPC only, (2) 5GC only, or (3) both EPC and 5GC. This may be because different operators may introduce support for 5GC at different times.

A LTE eNB may broadcast information about which core networks are available on each PLMN to assist the different UEs in performing core network selection. Thus, LTE system information (SI) may be extended to provide information about the available core networks for each PLMN. An extension to the system information should ensure backward compatibility. For example, the extension may ensure that UEs capable only of EPC-NAS can be connected to EPC and thus served by EPS. For an LTE eNB that is connected to 5GC only, the UEs only capable of EPC-NAS should be barred and should reselect to a different cell.

The current version of the SystemInformationBlock1 and SystemInformationBlock2 are presented below for reference.

A problem with existing system information is that system information in cells serving both EPS and 5GS should ideally be backwards compatible so that the cell can serve legacy UEs connected to EPC/EPS. On the other hand, because radio resources are scarce, designing new and separate SI for UEs connected to 5GC and served by 5GS is not acceptable. This affects the information about network configuration and its capabilities acquired by UEs via SI because the information may become ambiguous with respect to its validity in EPS and 5GS. Two examples are briefly discussed below.

For shared RAN (Multi Operator Core Network support, see TS 23.512), a cell broadcasts in the SI a list of operators sharing the cell listed as PLMNs. At registration (Attach), a UE indicates to the RAN its selected PLMN. At the selection process though, the UE cannot determine whether the selected PLMN is supported in 5GS as well as in EPS, or in only one of the systems.

Similarly, other broadcasted network capabilities (e.g., multimedia broadcast multicast services (MBMS), access barring, etc.) may be ambiguous with respect to their applicability on the system level (i.e., whether they are applicable in the same level in EPS as well as in 5GS). This may result in a UE receiving ambiguous information, resulting in a UE that may make incorrect determinations and be misaligned with the network configuration.

SUMMARY

Certain embodiments include a radio access network (RAN)/cell that indicates in its system information (SI) the applicability of particular system information to fifth generation system core (5GSC) networks, where a user equipment (UE) may unambiguously identify the particular system information as valid in evolved packet system (EPS) or fifth generation system (5GS).

For example, with respect to a shared RAN, system information may indicate whether a public land mobile network (PLMN) supports 5GS. Some embodiments may facilitate future long term evolution (LTE) cells that only support 5GS. Particular embodiments include using existing parameters to bar the cell for operator use which prevents legacy UEs from camping or connecting to the cell. New UEs supporting 5GS ignore the parameter. Particular embodiments use a new parameter to indicate if the cell is also barred for UEs that support 5GS.

According to some embodiments, a method for use in a wireless device of acquiring system information associated with a core network comprises receiving system information (e.g., system information block one (SIB1), system information block two (SIB2), etc.) from a network node. The network node is connected to one or more core networks. The system information includes an indication of a network type (e.g., EPS, 5GS, etc.) for each core network. The method further comprises determining a capability of the wireless device for connecting to the plurality of network types, and determining whether to connect to a core network based on the network type and the capability of the wireless device. In particular embodiments, the indication of the network type comprises a list of PLMNs connected to the network node and an indication of network types supported by each PLMN.

In particular embodiments, determining whether to connect to a core network comprises determining not to connect to any of the one or more core networks, and the method further comprises connecting to a different network node.

In particular embodiments, determining the capability of the wireless device for connecting to the plurality of network types comprises determining the wireless device is capable of connecting to a 5GS core network type, and the method further comprises interpreting one or more parameters of the received system information differently for 5GS than for EPS (e.g., ignore EPS barring parameter in favor of 5GS barring parameter). Interpreting one or more parameters of the received system information differently for 5GS may comprise obtaining an indication (e.g., receiving dedicated or broadcast signaling from the network node) that one or more information elements of the system information are to be interpreted according to 5GS. Obtaining the indication that one or more information elements are to be interpreted according to 5GS may comprise determining that the wireless device is connected to a 5GS core network.

In particular embodiments, determining the capability of the wireless device for connecting to the plurality of network types comprises determining the wireless device is capable of connecting to a 5GS core network type, and the method further comprises acquiring 5GS specific system information blocks.

According to some embodiments, a wireless device is capable of acquiring system information associated with a core network. The wireless device comprises processing circuitry operable to receive system information (e.g., SIB1, SIB2, etc.) from a network node. The network node is connected to one or more core networks. The system information includes an indication of a network type (e.g., EPS, 5GS, etc.) for each core network. The processing circuitry is further operable to determine a capability of the wireless device for connecting to the plurality of network types, and determine whether to connect to a core network based on the network type and the capability of the wireless device for connecting to the plurality of network types. In particular embodiments, the indication of the network type comprises a list of PLMNs connected to the network node and an indication of network types supported by each PLMN.

In particular embodiments, the processing circuitry determines not to connect to any of the core networks, and the processing circuitry is further operable to connect to a different network node.

In particular embodiments, the processing circuitry determines the wireless device is capable of connecting to a 5GS core network type, and the processing circuitry is further operable to interpret one or more parameters of the received system information differently for 5GS than for EPS (e.g., ignore EPS barring parameter in favor of 5GS barring parameter). The processing circuitry may be operable to interpret one or more parameters of the received system information differently for 5GS by obtaining an indication (e.g., receiving dedicated or broadcast signaling from the network node) that one or more information elements of the system information are to be interpreted according to 5GS. The processing circuitry may be operable to obtain the indication that one or more information elements are to be interpreted according to 5GS by determining that the wireless device is connected to a 5GS core network.

In particular embodiments, the processing circuitry determines the wireless device is capable of connecting to a 5GS core network type, and the processing circuitry is further operable to acquire 5GS specific system information blocks.

According to some embodiments, a method for use in a network node of providing system information associated with a core network comprises determining the network node is connected to one or more core networks, and transmitting system information (e.g., SIB1, SIB2, etc.). The system information includes an indication of a network type (e.g., EPS, 5GS, etc.) for each core network. The indication of the network type may comprise a list of identifiers of one or more PLMNs connected to the network node and an indication of one or more network types supported by each PLMN.

In particular embodiments, a core network of the one or more core networks is a 5GS core network. The system information for the core network includes parameters that have a different meaning with respect to 5GS than with respect to EPS. The system information may include 5GS specific system information blocks.

In particular embodiments, the method further comprises transmitting an indication (e.g., dedicated signaling or broadcast signaling) that one or more information elements of the system information are to be interpreted according to 5GS.

According to some embodiments, a network node is capable of providing system information associated with a core network. The network node comprises processing circuitry operable to determine the network node is connected to one or more core networks, and transmit system information (e.g., SIB1, SIB2, etc.). The system information includes an indication of a network type (e.g., EPS, 5GS, etc.) for each core network of the one or more core networks. The indication of the network type may comprise a list of identifiers of one or more PLMNs connected to the network node and an indication of one or more network types supported by each PLMN.

In particular embodiments, a core network of the one or more core networks is a 5GS core network. The system information for the core network includes parameters that have a different meaning with respect to 5GS than with respect to EPS. The system information may include 5GS specific system information blocks.

In particular embodiments, the processing circuitry is further operable to transmit an indication (e.g., dedicated signaling or broadcast signaling) that one or more information elements of the system information are to be interpreted according to 5GS.

According to some embodiments, a wireless device is capable of acquiring system information associated with a core network. The wireless device comprises a receiving module and a determining module. The receiving module is operable to receive system information from a network node. The network node is connected to one or more core networks. The system information includes an indication of a network type for each core network of the one or more core networks. The determining module is operable to determine a capability of the wireless device for connecting to the plurality of network types, and determine whether to connect to a core network of the one or more core networks based on the network type of the core network and the capability of the wireless device for connecting to the plurality of network types.

According to some embodiments, a network node is capable of providing system information associated with a core network. The network node comprises a determining module and a transmitting module. The determining module is operable to determine the network node is connected to one or more core networks. The transmitting module is operable to transmit system information. The system information includes an indication of a network type for each core network of the one or more core networks.

Also disclosed is a computer program product. The computer program product comprises instructions stored on non-transient computer-readable media which, when executed by a processor, perform the steps of: receiving system information from a network node that is connected to one or more core networks of a particular network type (e.g., EPS, 5GS, etc.); determining a capability of the wireless device for connecting to a plurality of network types, and determining whether to connect to a core network based on its network type and the capability of the wireless device.

Another computer program product comprises instructions stored on non-transient computer-readable media which, when executed by a processor, perform the steps of determining the network node is connected to one or more core networks, and transmitting system information (e.g., SIB1, SIB2, etc.). The system information includes an indication of a network type (e.g., EPS, 5GS, etc.) for each core network.

Certain embodiments of the present disclosure may provide one or more technical advantages. For example, in some embodiments a UE can unambiguously interpret the content of the system information when acquiring system information from a cell serving EPS and 5GS simultaneously. This may avoid incorrect UE understanding of network capabilities. Particular embodiments that indicate support for 5GC on a per PLMN basis facilitate different operators sharing the same RAN node. Upgrading to 5GC support may be performed at different times. Requiring all operators to upgrade at the same time is more challenging, and thus undesirable. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

As described in the Introduction, Third Generation Partnership Project (3GPP) is currently specifying fifth generation (5G) new radio (NR) and a next generation packet core network (NG-CN, NGC, 5GC, or 5G-CN). Network deployments based on different 3GPP core networks (e.g., evolved packet core (EPC)-based and 5GC-based) and user equipment (UEs) with different capabilities (e.g., EPC-NAS and 5GC-NAS) may coexist at the same time within one public land mobile network (PLMN). A UE that is capable of supporting 5GC-NAS procedures may also be capable of supporting EPC-NAS procedures. Therefore, UEs that are capable only of EPC-NAS must be connected to EPC, while UEs that are capable of 5GC-NAS can be connected either to EPC or 5GC.

A long term evolution (LTE) eNB can belong to multiple PLMNs (e.g., for RAN network sharing). For each PLMN, the LTE eNB can be connected to: (1) EPC only, (2) 5GC only, or (3) both EPC and 5GC. This may be because different operators may introduce support for 5GC at different times.

A LTE eNB may broadcast information about which core networks are available on each PLMN to assist the different UEs in performing core network selection. Particular embodiments may extend the LTE system information (SI) to provide information about the available core networks for each PLMN. Particular embodiments ensure backward compatibility. For example, particular embodiments ensure that UEs capable only of EPC-NAS can be connected to EPC and thus served by EPS. For an LTE eNB that is connected to 5GC only, the UEs only capable of EPC-NAS may be barred and may reselect to a different cell.

Certain embodiments include a radio access network (RAN)/cell that indicates in its SI the applicability of particular system information to 5GS networks, where a UE may unambiguously identify the particular system information as valid in evolved packet system (EPS) or fifth generation system (5GS).

For example, with respect to a shared RAN, system information may indicate whether a PLMN supports 5GS. Some embodiments may facilitate future LTE cells to only support 5GS. Particular embodiments include using existing parameters to bar the cell for operator use which prevents legacy UEs from camping or connecting to the cell. New UEs supporting 5GS ignore the parameter. Particular embodiments use a new parameter to indicate if the cell is also barred for UEs that support 5GS.

In some embodiments, a UE can unambiguously interpret the content of the system information when acquiring system information from a cell serving EPS and 5GS simultaneously. This may avoid incorrect UE understanding of network capabilities. Particular embodiments that indicate support for 5GC on a per PLMN basis facilitate different operators sharing the same RAN node. Upgrading to 5GC support may be performed at different times. Requiring all operators to upgrade at the same time is more challenging, and thus undesireable.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Particular embodiments are described with reference to FIGS. 2-7 of the drawings, like numerals being used for like and corresponding parts of the various drawings. LTE and NR are used throughout this disclosure as example cellular systems, but the ideas presented herein may apply to other wireless communication systems as well.

Figure 2:
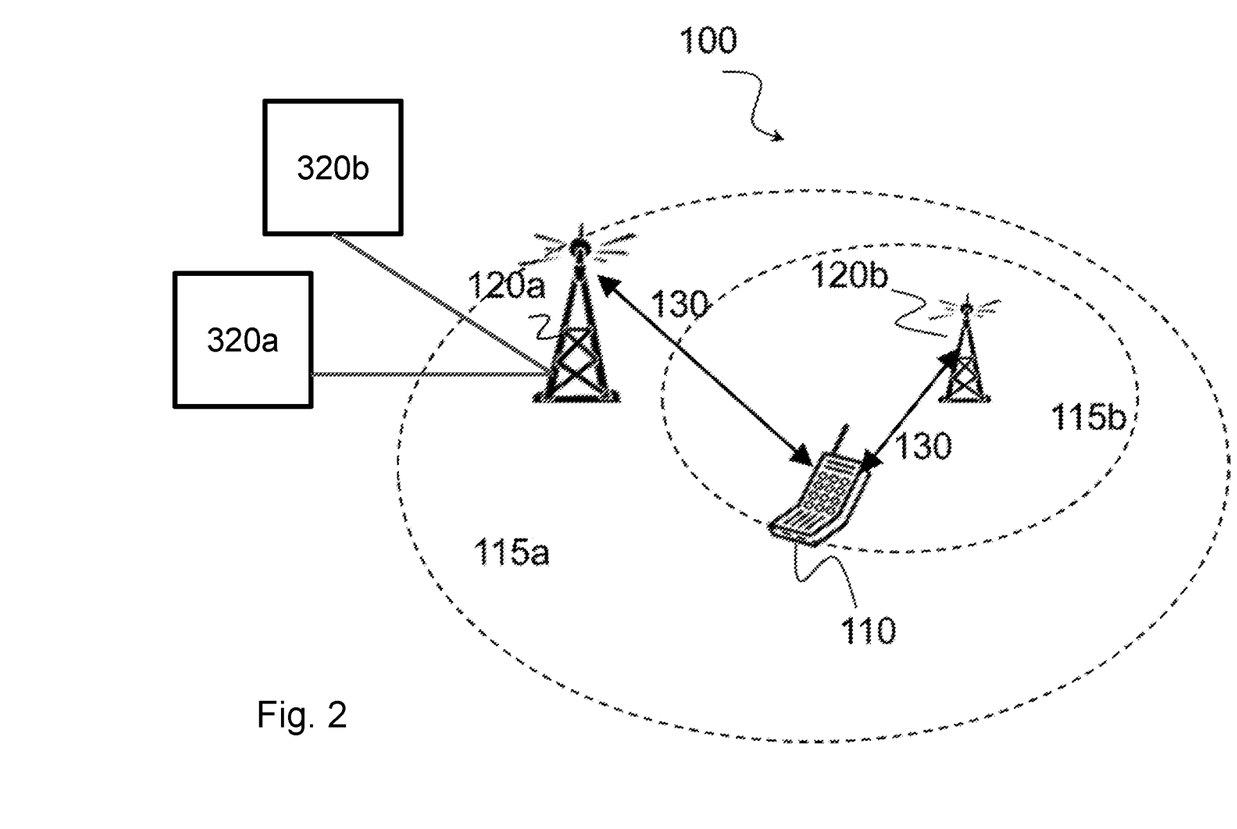
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, gNB, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Wireless signals 130 may include both downlink transmissions (from radio network node 120 to wireless devices 110) and uplink transmissions (from wireless devices 110 to radio network node 120). Wireless signals 130 may include synchronization signals and reference signals in addition to data and control channels. Wireless signals 130 may include system information.

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network 100 may include carrier aggregation. For example, wireless device 110 may be served by both network node 120a and 120b and communicate wireless signals 130 with both network node 120a and 120b.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform listen before talk (LBT) protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In certain embodiments, network nodes 125 may interface with a radio network controller (RNC). The radio network controller may control network nodes 120 and may provide certain radio resource management functions, mobility management functions, and/or other suitable functions. In certain embodiments, the functions of the radio network controller may be included in network node 120. The radio network controller may interface with a core network node (CN), such as core network node 320.

Core network node 320 may comprise an EPS core network node, a 5GS core network node, or any other suitable type of core network node. In some embodiments network node 120 may be connected to one or more core network nodes (e.g., core network nodes 320a and 320b). Core network nodes 320a and 320b may of the same or different network types.

In certain embodiments, the radio network controller may interface with core network node 320 via an interconnecting wired or wireless network. The interconnecting network may refer to any interconnecting system capable of transmitting audio, video, signals, data, messages, or any combination of the preceding The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 320 may manage the establishment of communication sessions and various other functionalities for wireless devices 110. Examples of core network node 320 may include mobile switching center (MSC), mobility management entity (MME), serving gateway (SGW), packet data network gateway (PGW), operation and maintenance (O&M), operations support system (OSS), SON, positioning node (e.g., Enhanced Serving Mobile Location Center, (E-SMLC)), MDT node, etc. Wireless devices 110 may exchange certain signals with core network node 320 using the non-access stratum layer. In non-access stratum signaling, signals between wireless devices 110 and core network node 320 may be transparently passed through the radio access network. In certain embodiments, network nodes 120 may interface with one or more network nodes 120 over an internode interface, such as, for example, an X2 interface.

In some embodiments, network node 120 broadcasts system information. Wireless devices 110a and 110b may receive the system information to determine a network configuration. Wireless devices 110a and 110b may use the network configuration to connect to the network.

According to some embodiments, wireless device 110 may acquire system information associated with core network 320 by receiving system information (e.g., system information block one (SIB1), system information block two (SIB2), etc.) from network node 120. Network node 120 is connected to one or more core networks 320. The system information includes an indication of a network type (e.g., EPS, 5GS, etc.) for each core network 320. Wireless devices 110 determines a capability of wireless device 110 for connecting to the plurality of network types. For example, wireless device 110 determines whether it can connect to EPS only, 5GS only, both EPS and 5GS, etc. Wireless device 110 determines whether to connect to a particular core network 320 based on the network type and the capability of wireless device 110. In particular embodiments, the indication of the network type comprises a list of PLMNs connected to the network node and an indication of network types supported by each PLMN.

In particular embodiments, determining whether to connect to a core network 320 comprises determining not to connect to any of the one or more core networks 320. For example, based on the capabilities of wireless device 110 (e.g., EPS only), wireless device 110 may not be able to connect to any core network 320 (e.g., 5GS only). In which case, wireless device 110 may connect to another network node 120.

In particular embodiments, wireless device 110 is capable of connecting to a 5GS core network type. Wireless device 110 may interpret one or more parameters of the received system information differently for 5GS than for EPS or may acquire 5GS specific system information blocks. Interpreting one or more parameters of the received system information differently for 5GS may comprise obtaining an indication (e.g., receiving dedicated or broadcast signaling from network node 120) that one or more information elements of the system information are to be interpreted according to 5GS. Obtaining the indication that one or more information elements are to be interpreted according to 5GS may comprise determining that wireless device 110 is connected to a 5GS core network 320.

According to some embodiments, network node 120 provides system information (e.g. SIB1, SIB2, etc.) associated with core network 320 by determining network node 120 is connected to one or more core networks 320. Network node 120 transmits system information that includes an indication of a network type (e.g., EPS, 5GS, etc.) for each core network 320. The indication of the network type may comprise a list of identifiers of one or more PLMNs connected to network node 120 and an indication of one or more network types supported by each PLMN.

In particular embodiments, core network 320 is a 5GS core network. The system information for core network 320 includes parameters that have a different meaning with respect to 5GS than with respect to EPS. The system information may include 5GS specific system information blocks.

In particular embodiments, network node 120 transmits an indication (e.g., dedicated signaling or broadcast signaling) that one or more information elements of the system information are to be interpreted according to 5GS. The system information with respect to EPS and 5GS core networks is described in more detail below.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 5A. Similarly, a network node may include any suitable combination of hardware and/or software. For example, in particular embodiments, a network node, such as network node 120, may include the components described below with respect to FIG. 6A. A core network node may include any suitable combination of hardware and/or software. For example, in particular embodiments, a core network node, such as core network node 320, may include the components described below with respect to FIG. 7.

Particular embodiments indicate support for 5GC per PLMN. In one example, the SIB1 PLMN list is extended with additional information element (IE) indicating support for 5GC. An advantage of this example is that the UE only needs to read SIB1 to determine which core network(s) are supported for each PLMN. In another example, a separate list IE can be added in SIB2, which is interpreted by the UE as per PLMN (i.e., combining the information in SIB2 with the PLMN list in SIB1).

An LTE eNB broadcasts information about which PLMNs are available in SIB1 in the PLMN-IDENTITY-LIST' described in 3GPP TS 36.331, "Evolved Universal Terrestrial Radio Access (E-UTRA); Radio Resource Control (RRC); Protocol specification (Release 14); Protocol specification", September 2016, which is hereby incorporated. The 'PLMN-IDENTITY-LIST' contains the PLMN IDs of the PLMNs to which the eNB is connected. The 'PLMN-IDENTITY-LIST' is limited to a maximum of six PLMN IDs. To inform the UEs about which core networks are available for a given PLMN, some embodiments extend the 'PLMN-IDENTITY-LIST' with an additional information element (IE) per PLMN ID, to indicate if, for the corresponding PLMN, the LTE eNB is connected to EPC only or to both EPC and 5GC.

SIB2 in LTE includes a list with dedicated barring information for each PLMN, namely AC-BarringPerPLMN as described in TS 36.331. Accordingly, some embodiments inform a UE about the available core networks for each PLMN by extending the AC-BarringPerPLMN list with a new IE per PLMN (e.g., an additional entry in the barring list) that indicates the available core networks (i.e., EPC only or both EPC and 5GC). An advantage these embodiments is that the barring information may be used to perform load balancing between EPC and 5GC within one PLMN. For example, if the 5GC is temporarily overloaded, it is possible to temporarily bar 5GC so that all new incoming UEs are forced to attach to EPC.

Some embodiments indicate which system information is relevant for EPS and 5GS. For example, when the LTE eNB is connected to both EPC and 5G-CN (5GC) and serves both new and legacy UE, particular embodiments indicate which system information is applicable when the UE is connected to EPS or to 5GS.

Particular embodiments may apply the following principles for interpreting system information. UEs connected to EPC may assume that all current system information applies. UEs connected to 5G-CN may assume that all the current system information applies unless an indication is included (in the system information or via dedicated signaling), informing the UE that an alternative parameter or interpretation should be applied. The indication may be per a system information element or per group of system information elements (whole system info block). The alternative parameter may be sent in alternative system information blocks only read by new UEs (e.g., SIB3alt).

Additionally, 5G UEs may follow specified rules in the specification or a UE may include a configuration indicating which set of existing system information should be followed and which set should be ignored. Which system information blocks should be applied or ignored can be signaled from the network using dedicated signaling or broadcasted.

Particular embodiments facilitate 5GS-only cells. To deploy 5GC only LTE networks, particular embodiments may set the CellReservedForOperatorUse to Reserved so that legacy UEs ignore the cell/PLMN. The extension field to CellReservedForOperatorUse overrides the legacy value and forces UEs capable of only EPC-NAS to reselect to a different cell.

Some embodiments create a new SIB1 instance which can only be comprehended by 5GC capable UEs. The new SIB1 instance may be done with a critical extension to SIB1 (i.e., SIB1-r15) or using a new BCCH-DL-SCH logical channel (i.e., BCCH-DL-SCH-5GCN).

Some embodiments may indicate in the MasterInformationBlock a parameter that causes legacy UEs to ignore the cell (e.g., set an invalid value for the dl-Bandwidth). A MasterInformationBlock is illustrated below:

| MasterInformationBlock | |
|---|---|
| -- ASN1START | |
| MasterInformationBlock ::= | SEQUENCE { |
| dl-Bandwidth | ENUMERATED { |
| | n6, n15, n25, n50, n75, n100}, |
| phich-Config | PHICH-Config, |
| systemFrameNumber | BIT STRING (SIZE (8)), |
| schedulingInfoSIB1-BR-r13 | INTEGER (0..31), |
| spare | BIT STRING (SIZE (5)) |
| } | |
| -- ASN1STOP | |

Using an existing parameter to bar the cell for operator use prevents legacy UEs from camping or connecting to the cell. 5G UEs supporting 5GS ignore the parameter. Some embodiments include a parameter to indicate if the cell is also barred for 5G UEs supporting 5GS.

Particular embodiments include methods in a wireless device and a network node. Examples are illustrated in FIGS. 3 and 4, respectively.

Figure 3:
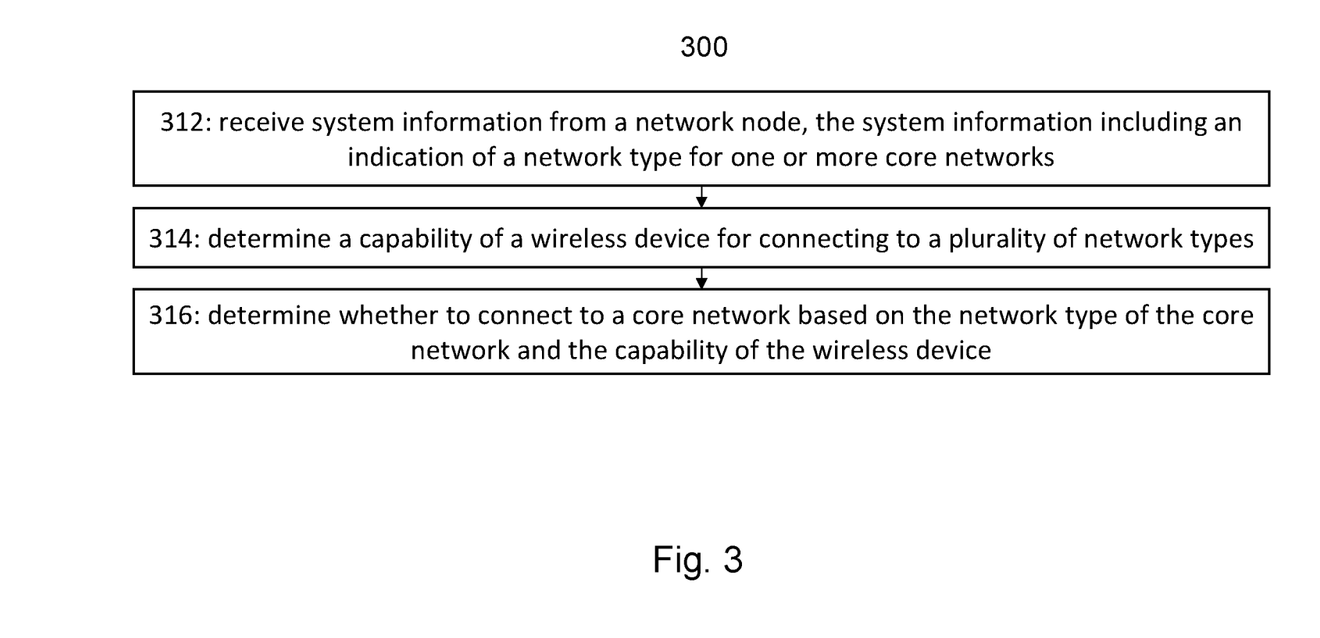
FIG. 3 is a flow diagram of an example method in a user equipment, according to some embodiments.
Figure 4:
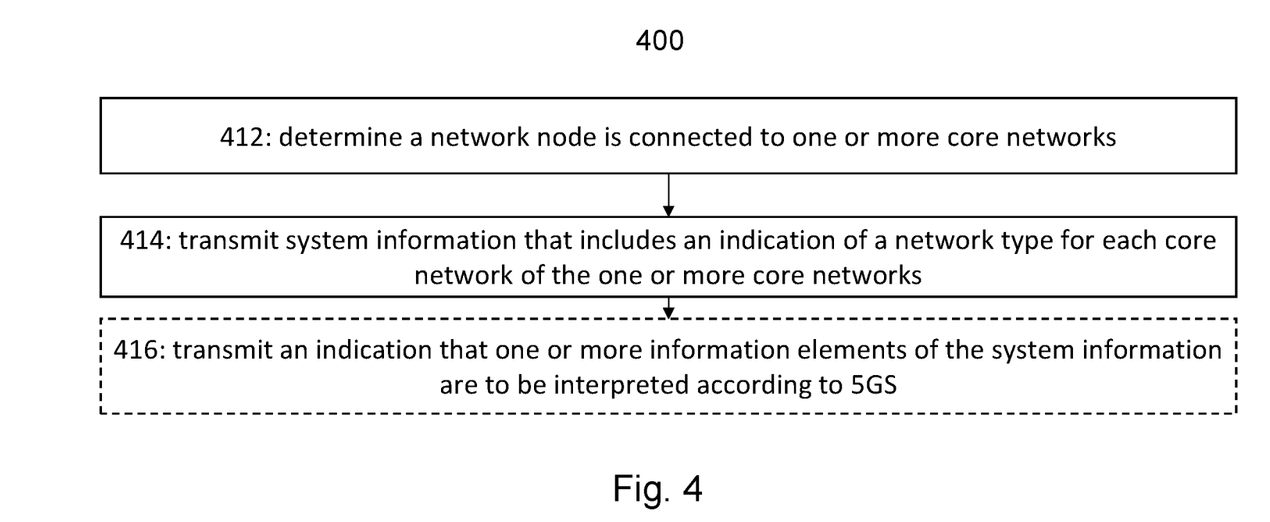
FIG. 4 is a flow diagram of an example method in a network node, according to some embodiments.

FIG. 3 is a flow diagram of an example method in a user equipment, according to some embodiments. Method 300 includes steps for acquiring system information associated with a core network. In particular embodiments, one or more steps of FIG. 3 may be performed by wireless device 110 of wireless network 100 described with respect to FIG. 2.

The method begins at step 312, where the user equipment receives system information from a network node. The network node is connected to one or more core networks. The system information includes an indication of a network type for one or more core networks.

For example, wireless device 110 may receive system information from network node 120a. Network node 120a may be connected to core networks 320a and 320b. Core networks 320a and 320b may be an EPS core network type, a 5GS core network type, or any other suitable core network type. Network node 120a may broadcast system information, such as SIB1, SIB2, or any other suitable system information, that includes an indication of the network type of core networks 320a and 320b (e.g., core network 320a may be an EPS core network type and 320b may be a 5GS core network type, both core networks 320a and 320b may be a 5GS core network type, both core networks 320a and 320b may be an EPS core network type, etc.).

In particular embodiments, the indication of the network type comprises a list of PLMNs connected to network node 120a and an indication of network types supported by each PLMN. In one example, the SIB1 PLMN list is extended with an additional information element (IE) indicating support for 5GS. An advantage of this example is that wireless device 110 only needs to read SIB1 to determine which core network(s) 320 are supported for each PLMN. In another example, a separate list IE can be added in SIB2. Wireless device 110 interprets the list as per PLMN (i.e., combining the information in SIB2 with the PLMN list in SIB1).

In another example, the indication of the network type comprises a list with dedicated barring information for each PLMN, such as the AC-BarringPerPLMN list. Network node 120a informs wireless device 110 about available core networks 320 for each PLMN by extending the AC-BarringPerPLMN list with a new IE per PLMN (e.g., an additional entry in the barring list) that indicates the available core networks 320 (i.e., EPC only or both EPC and 5GC). An advantage these embodiments is that the barring information may be used to perform load balancing between EPC and 5GC within one PLMN. For example, if the 5GC is temporarily overloaded, it is possible to temporarily bar 5GC so that all new incoming wireless devices 110 are forced to attach to EPC.

At step 314, the user equipment determines a capability of the wireless device for connecting to the plurality of network types. For example, wireless device 110 may determine that it capable of connecting to an EPS core network 320, a 5GS core network 320, both an EPS and a 5GS core network 320, etc. Wireless device 110 may be preconfigured with its capabilities.

At step 316, the user equipment determines whether to connect to a core network based on the network type and the capability of the wireless device. For example, wireless device 110 may determine that it is capable of connecting to a 5GS core network and based on the indication in the system information, wireless device 110 knows that core network 320b is a 5GS core network. Wireless device 110 may decide to connect to core network 320b.

As another example, wireless device 110 may determine that it is only capable of connecting to an EPS core network and, based on the indication in the system information, wireless device 110 knows that core network 320a is an EPS core network. Wireless device 110 may decide to connect to core network 320a.

As another example, wireless device 110 may determine that it is only capable of connecting to an EPS core network and, based on the indication in the system information, wireless device 110 knows that core networks 320a and 320b are both 5GS core networks. Wireless device 110 may reselect to network node 120b and repeat steps 312-316 to determine whether wireless device 110 can connect to a core network attached to network node 120b.

In some embodiments, one or more parameters of system information may be interpreted differently for 5GS than for EPS. Some embodiments indicate which system information is relevant for EPS and 5GS. For example, when network node 120a is connected to both EPS and 5GS, particular embodiments indicate which system information is applicable when wireless device 110 is connected to EPS or to 5GS.

Particular embodiments may apply the following principles for interpreting system information. Wireless device 110 connected to EPS may assume that all current system information applies. Wireless device 110 connected to 5GS may assume that all the current system information applies unless an indication is included (in the system information or via dedicated signaling), informing wireless device 110 that an alternative parameter or interpretation should be applied. The indication may be per a system information element or per group of system information elements (whole system info block). The alternative parameter may be sent in alternative system information blocks only read by a 5G wireless device 110 (e.g., SIB3alt).

Additionally, 5G wireless device 110 may follow specified rules in the specification or 5G wireless device 110 may include a configuration indicating which set of existing system information should be followed and which set should be ignored. Which system information blocks should be applied or ignored can be signaled from the network using dedicated signaling or broadcasted.

Modifications, additions, or omissions may be made to method 300 illustrated in FIG. 3. Additionally, one or more steps in method 300 may be performed in parallel or in any suitable order.

FIG. 4 is a flow diagram of an example method in a network node, according to some embodiments. Method 400 includes steps for providing system information associated with a core network. In particular embodiments, one or more steps of FIG. 4 may be performed by network node 120 of wireless network 100 described with respect to FIG. 2.

The method begins at step 412, where the network node determines the network node is connected to one or more core networks. For example, network node 120a determines that it is connected to core networks 320a and 320b. Core networks 320a and 320b may comprise any of the core network types described above with respect to FIG. 3.

At step 414, the network node transmits system information that includes an indication of a network type for each core network. For example, network node 120a may transmit system information as described above with respect to step 312 of FIG. 3.

At step 416, the network node may transmit an indication that one or more information elements of the system information are to be interpreted according to 5GS. For example, network node 120a may transmit an indication as described with respect to step 316 of FIG. 3.

Modifications, additions, or omissions may be made to method 400 illustrated in FIG. 4. Additionally, one or more steps in method 400 may be performed in parallel or in any suitable order.

Figure 5A:
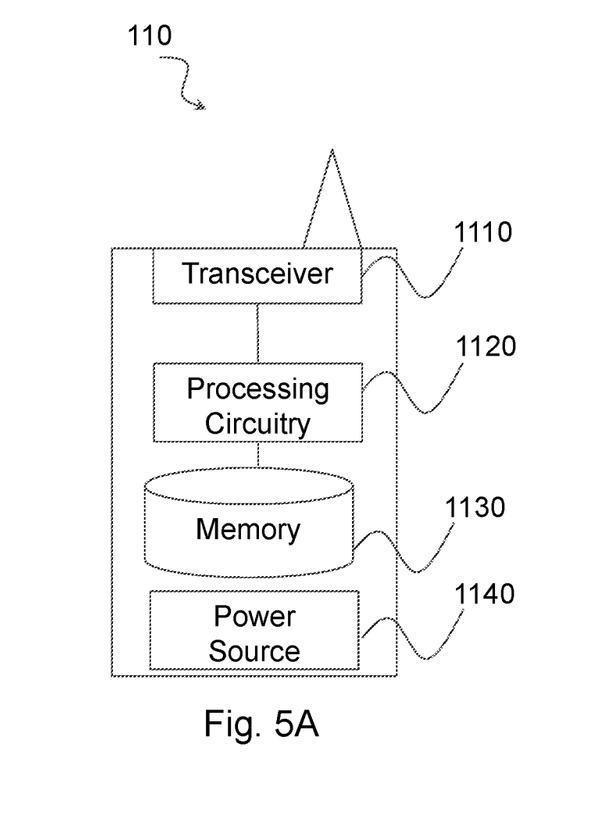
FIG. 5A is a block diagram illustrating an example embodiment of a wireless device.

FIG. 5A is a block diagram illustrating an example embodiment of a wireless device. The wireless device is an example of the wireless devices 110 illustrated in FIG. 2. In particular embodiments, the wireless device is capable of receiving system information (e.g., system information block one (SIB1), system information block two (SIB2), etc.) from a network node. The network node is connected to one or more core networks, and the system information includes an indication of a network type (e.g., EPS, 5GS, etc.) for each core network. The wireless device is capable of determining a capability of the wireless device for connecting to the plurality of network types, and determining whether to connect to a core network based on the network type and the capability of the wireless device.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1110, processing circuitry 1120, memory 1130, and power source 1140. In some embodiments, transceiver 1110 facilitates transmitting wireless signals to and receiving wireless signals from wireless network node 120 (e.g., via an antenna), processing circuitry 1120 executes instructions to provide some or all of the functionality described herein as provided by the wireless device, and memory 1130 stores the instructions executed by processing circuitry 1120. Power source 1140 supplies electrical power to one or more of the components of wireless device 110, such as transceiver 1110, processing circuitry 1120, and/or memory 1130.

Processing circuitry 1120 includes any suitable combination of hardware and software implemented in one or more integrated circuits or modules to execute instructions and manipulate data to perform some or all of the described functions of the wireless device. In some embodiments, processing circuitry 1120 may include, for example, one or more computers, one more programmable logic devices, one or more central processing units (CPUs), one or more microprocessors, one or more applications, and/or other logic, and/or any suitable combination of the preceding.

Processing circuitry 1120 may include analog and/or digital circuitry configured to perform some or all of the described functions of wireless device 110. For example, processing circuitry 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1140 is generally operable to supply electrical power to the components of wireless device 110. Power source 1140 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 5A) responsible for providing certain aspects of the wireless device's functionality, including any of the functionality described above and/or any additional functionality (including any functionality necessary to support the solution described above).

Figure 5B:
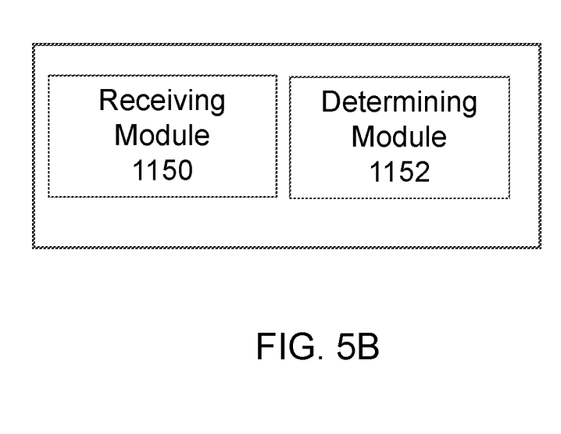
FIG. 5B is a block diagram illustrating example components of a wireless device.

FIG. 5B is a block diagram illustrating example components of wireless device 110. The components may include receiving module 1150 and determining module 1152.

Receiving module 1150 may perform the receiving functions of wireless device 110. For example, receiving module 1150 may receive system information and/or signaling for how to interpret system information as described in any of the embodiments or examples above (e.g., steps 312 and/or 316 of FIG. 3). In certain embodiments, receiving module 1150 may include or be included in processing circuitry 1120. In particular embodiments, receiving module 1150 may communicate with determining module 1152.

Determining module 1152 may perform the determining functions of wireless device 110. For example, determining module 1152 may determine capabilities of a wireless device and/or determine whether to connect to a particular core network according to any of the examples described above (e.g., steps 314 and 316 of FIG. 3). In certain embodiments, determining module 1152 may include or be included in processing circuitry 1120. In particular embodiments, determining module 1152 may communicate with receiving module 1150.

Figure 6A:
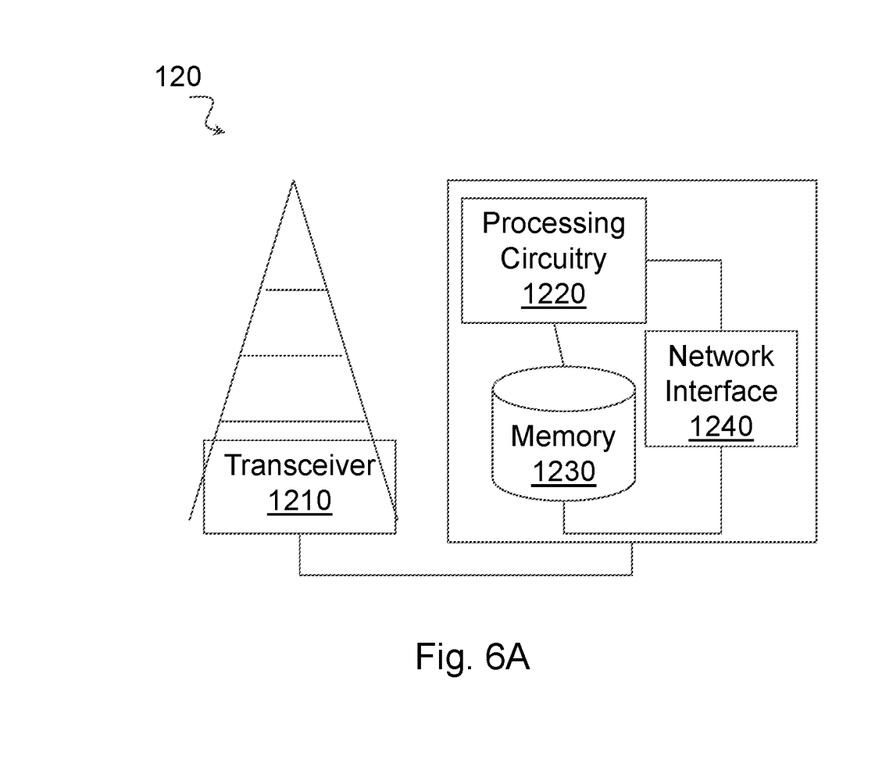
FIG. 6A is a block diagram illustrating an example embodiment of a network node.

FIG. 6A is a block diagram illustrating an example embodiment of a network node. The network node is an example of network node 120 illustrated in FIG. 2. In particular embodiments, the network node is capable of determining the network node is connected to one or more core networks, and transmitting system information (e.g., SIB1, SIB2, etc.) that includes an indication of a network type (e.g., EPS, 5GS, etc.) for each core network.

Network node 120 can be an eNodeB, a nodeB, gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1210, at least one processing circuitry 1220, at least one memory 1230, and at least one network interface 1240. Transceiver 1210 facilitates transmitting wireless signals to and receiving wireless signals from a wireless device, such as wireless devices 110 (e.g., via an antenna); processing circuitry 1220 executes instructions to provide some or all of the functionality described above as being provided by a network node 120; memory 1230 stores the instructions executed by processing circuitry 1220; and network interface 1240 communicates signals to backend network components, such as a gateway, switch, router, Internet, Public Switched Telephone Network (PSTN), controller, and/or other network nodes 120. Processing circuitry 1220 and memory 1230 can be of the same types as described with respect to processing circuitry 1120 and memory 1130 of FIG. 5A above.

In some embodiments, network interface 1240 is communicatively coupled to processing circuitry 1220 and refers to any suitable device operable to receive input for network node 120, send output from network node 120, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network.

Other embodiments of network node 120 include additional components (beyond those shown in FIG. 6A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 6B:
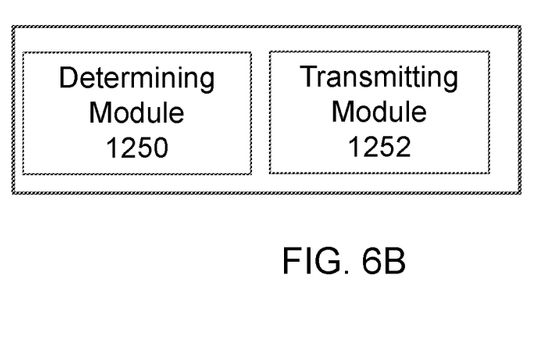
FIG. 6B is a block diagram illustrating example components of a network node.

FIG. 6B is a block diagram illustrating example components of network node 120. The components may include determining module 1250 and transmitting module 1252.

Determining module 1250 may perform the determining functions of network node 120. For example, determining module 1250 may determine that it is connected to one or more core networks as described in any of the embodiments or examples above (e.g., step 412 of FIG. 4). In certain embodiments, determining module 1250 may include or be included in processing circuitry 1220. In particular embodiments, determining module 1250 may communicate with transmitting module 1252.

Transmitting module 1252 may perform the transmitting functions of network node 120. For example, transmitting module 1252 may transmit system information and/or an indication of how to interpret system information according to any of the examples described above (e.g., steps 414 and 416 of FIG. 4). In certain embodiments, transmitting module 1252 may include or be included in processing circuitry 1220. In particular embodiments, transmitting module 1252 may communicate with determining module 1250.

Figure 7:
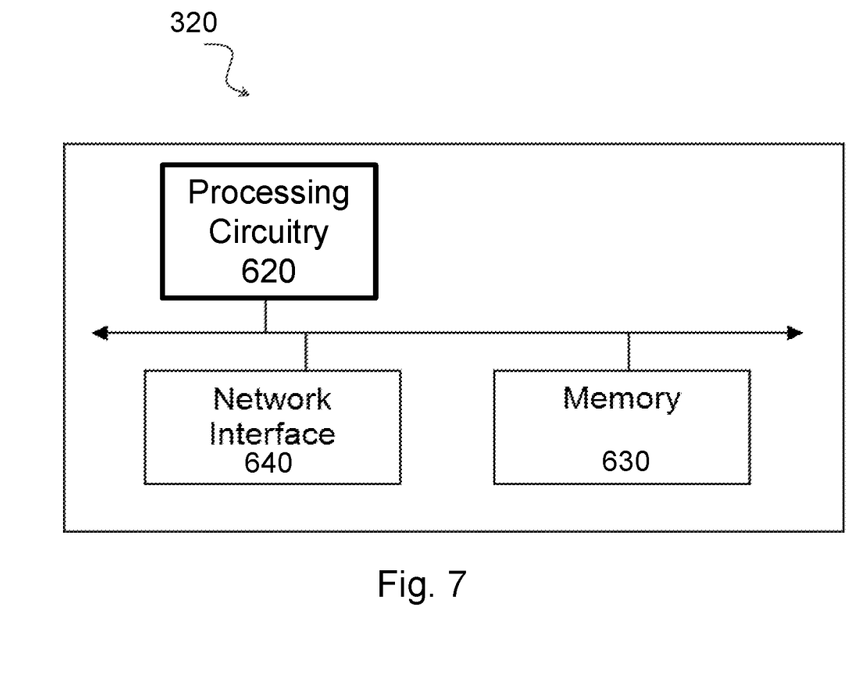
FIG. 7 is a block diagram illustrating an example embodiment of a core network node.

FIG. 7 is a block schematic of an example core network node 320, in accordance with certain embodiments. In particular embodiments, the core network node may comprise an EPS core network node, a 5GS core network node, or any other suitable type of core network node . . .

Examples of core network nodes can include an Evolved Serving Mobile Location Centre (E-SMLC), a mobile switching center (MSC), a serving GPRS support node (SGSN), a mobility management entity (MME), a radio network controller (RNC), a base station controller (BSC), an access and mobility management function (AMF), and so on. The core network node includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 120, radio network controllers or core network nodes 320, etc.

Processing circuitry 620 may include any suitable combination of hardware and software implemented in one or more modules to execute instructions and manipulate data to perform some or all of the described functions of the core network node. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the core network node's functionality, including any of the functionality described above and/or any additional functionality (including any functionality necessary to support the solution described above).

Some embodiments of the disclosure may provide one or more technical advantages. Some embodiments may benefit from some, none, or all of these advantages. Other technical advantages may be readily ascertained by one of ordinary skill in the art. For example, in some embodiments a UE can unambiguously interpret the content of the system information when acquiring system information from a cell serving EPS and 5GS simultaneously. This may avoid incorrect UE understanding of network capabilities. Particular embodiments that indicate support for 5GC on a per PLMN basis facilitate different operators sharing the same RAN node. Upgrading to 5GC support may be performed at different times. Requiring all operators to upgrade at the same time is more challenging, and thus undesirable.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the scope of this disclosure.

Abbreviations

3GPP 3rd Generation Partnership Project
5GC Fifth Generation System
5GC Fifth Generation Core
AS Access Stratum
CA Carrier Aggregation
CC Component Carrier
CN Core Network
eMTC enhanced Machine Type Communications
eMTC-U enhanced Machine Type Communications for Unlicensed Band
eNB Evolved Node B
eNodeB Evolved Node B
EPC Evolved Packet Core
EPS Evolved Packet System
E-SMLC Evolved Serving Mobile Location Center
FeMTC Further enhanced MTC
FDD Frequency Division Duplex
gNB Fifth Generation Node B
GNSS Global Navigation Satellite System
ID Identifier
IoT Internet of Things
LBT Listen Before Talk
LPP LTE Positioning Protocol
LTE Long-Term Evolution
MF MuLTEfire
MME Mobility Management Entity
MSC Mobile Switching Center
MTC Machine Type Communication
NAS Non Access Stratum
NB-IoT NarrowBand-IoT
NB-IoT-U Narrow-band Internet of Things for Unlicensed Band
NGS Next Generation System
NR New Radio
NW Network
OTDOA Observed Time Difference of Arrival
PBCH Physical Broadcast Channel
PCID Physical Cell Identity
PCC Primary Component Carrier
PCell Primary Cell
PDU Protocol Data Unit
PGW Packet Data Network Gateway
PRB Physical Resource Block
PSD Power Spectral Density
RAT Radio Access Technology
RAN Radio Access Network
RRC Radio Resource Control
RSRP Reference Signal Received Power
RSRQ Reference Signal Received Quality
RSTD Reference Signal Time Difference
SCC Secondary Component Carrier
SCell Secondary Cell
SFN System Frame Number
SGW Serving Gateway
SLA Service Level Agreement
TDD Time Division Duplex
TDOA Time Difference Of Arrival
TOA Time Of Arrival
UE User Equipment UMTS Universal Mobile Telecommunications System
UTDOA Uplink Time Difference of Arrival

The invention claimed is:

1. A method for use in a wireless device of acquiring system information associated with a core network, the method comprising:
   receiving system information from a network node, the network node connected to one or more core networks, the system information including an indication of a network type for each core network of the one or more core networks, wherein the network type comprises a particular type of a plurality of network types, wherein the indication of the network type for each core network of the one or more core networks comprises a list of identifiers of one or more public land mobile networks (PLMNs) connected to the network node and an indication of one or more network types supported by each PLMN of the one or more PLMNs;
   determining a capability of the wireless device for connecting to the plurality of network types; and
   determining whether to connect to a core network of the one or more core networks based on the network type of the core network and the capability of the wireless device for connecting to the plurality of network types.

2. The method of claim 1, wherein the indication of the network type for each core network of the one or more core networks is received in system information block one (SIB1) or system information block two (SIB2).

3. The method of claim 1, wherein determining whether to connect to a core network of the one or more core networks comprises determining not to connect to any of the one or more core networks; and
   the method further comprises connecting to a different network node.

4. The method of claim 1, wherein the plurality of network types comprises an enhanced packet system (EPS) core network type and a fifth generation system (5GS) core network type.

5. The method of claim 4, wherein determining the capability of the wireless device for connecting to the plurality of network types comprises determining the wireless device is capable of connecting to a 5GS core network type; and
   the method further comprises interpreting one or more parameters of the received system information differently for 5GS than for EPS.

6. The method of claim 5, wherein interpreting one or more parameters of the received system information differently for 5GS than for EPS comprises ignoring an EPS barring parameter and determining whether to connect to a core network of the one or more core networks comprises evaluating a 5GS barring parameter.

7. The method of claim 5, wherein interpreting one or more parameters of the received system information differently for 5GS comprises obtaining an indication that one or more information elements of the system information are to be interpreted according to 5GS.

8. The method of claim 7, wherein obtaining the indication that one or more information elements are to be interpreted according to 5GS comprises at least one of receiving dedicated signaling or broadcast signaling from the network node.

9. The method of claim 7, wherein obtaining the indication that one or more information elements are to be interpreted according to 5GS comprises determining that the wireless device is connected to a 5GS core network.

10. The method of claim 4, wherein determining the capability of the wireless device for connecting to the plurality of network types comprises determining the wireless device is capable of connecting to a 5GS core network type; and
    the method further comprises acquiring 5GS specific system information blocks.

11. A wireless device capable of acquiring system information associated with a core network, the wireless device comprising processing circuitry operable to:
    receive system information from a network node, the network node connected to one or more core networks, the system information including an indication of a network type for each core network of the one or more core networks, wherein the network type comprises a particular type of a plurality of network types, wherein the indication of the network type for each core network of the one or more core networks comprises a list of identifiers of one or more public land mobile networks (PLMNs) connected to the network node and an indication of one or more network types supported by each PLMN of the one or more PLMNs;
    determine a capability of the wireless device for connecting to the plurality of network types; and
    determine whether to connect to a core network of the one or more core networks based on the network type of the core network and the capability of the wireless device for connecting to the plurality of network types.

12. The wireless device of claim 11, the processing circuitry is operable to receive the indication of the network type for each core network of the one or more core networks in system information block one (SIB1) or system information block two (SIB2).

13. The wireless device of claim 11, wherein when the processing circuitry determines not to connect to any of the one or more core networks, the processing circuitry is further operable to connect to a different network node.

14. The wireless device of claim 11, wherein the plurality of network types comprises an enhanced packet system (EPS) core network type and a fifth generation system (5GS) core network type.

15. The wireless device of claim 14, wherein when the processing circuitry determines the wireless device is capable of connecting to a 5GS core network type, the processing circuitry is further operable to interpret one or more parameters of the received system information differently for 5GS than for EPS.

16. The wireless device of claim 15, wherein the processing circuitry is operable to interpret one or more parameters of the received system information differently for 5GS than for EPS by ignoring an EPS barring parameter and is operable to determine whether to connect to a core network of the one or more core networks by evaluating a 5GS barring parameter.

17. The wireless device of claim 15, wherein the processing circuitry is operable to interpret one or more parameters of the received system information differently for 5GS by obtaining an indication that one or more information elements of the system information are to be interpreted according to 5GS.

18. The wireless device of claim 15, wherein the processing circuitry is operable to obtain the indication that one or more information elements are to be interpreted according to 5GS by at least one of receiving dedicated signaling or broadcast signaling from the network node.

19. The wireless device of claim 15, wherein the processing circuitry is operable to obtain the indication that one or more information elements are to be interpreted according to 5GS by determining that the wireless device is connected to a 5GS core network.

20. The wireless device of claim 14, wherein when the processing circuitry determines the wireless device is capable of connecting to a 5GS core network type, the processing circuitry is further operable to acquire 5GS specific system information blocks.

21. A method for use in a network node of providing system information associated with a core network, the method comprising:
    determining the network node is connected to one or more core networks; and
    transmitting system information, the system information including an indication of a network type for each core network of the one or more core networks, wherein the indication of the network type for each core network of the one or more core networks comprises a list of identifiers of one or more public land mobile networks (PLMNs) connected to the network node and an indication of one or more network types supported by each PLMN of the one or more PLMNs.

22. The method of claim 21, wherein the indication of the network type for each core network of the one or more core networks is in system information block one (SIB1) or system information block two (SIB2).

23. The method of claim 21, wherein the network type for each core network of the one or more core networks comprises one of an enhanced packet system (EPS) core network type and a fifth generation system (5GS) core network type.

24. The method of claim 21, wherein a core network of the one or more core networks is a 5GS core network and the system information for the core network includes parameters that have a different meaning with respect to 5GS than with respect to EPS.

25. The method of claim 21, wherein a core network of the one or more core networks is a 5GS core network and the system information for the core network includes 5GS specific system information blocks.

26. The method of claim 24, further comprising transmitting an indication that one or more information elements of the system information are to be interpreted according to 5GS.

27. The method of claim 26, wherein transmitting the indication that one or more information elements are to be interpreted according to 5GS comprises transmitting dedicated signaling or transmitting broadcast signaling.

28. A network node capable of providing system information associated with a core network, the network node comprising processing circuitry operable to:
    determine the network node is connected to one or more core networks; and
    transmit system information, the system information including an indication of a network type for each core network of the one or more core networks, wherein the indication of the network type for each core network of the one or more core networks comprises a list of identifiers of one or more public land mobile networks (PLMNs) connected to the network node and an indication of one or more network types supported by each PLMN of the one or more PLMNs.

29. The network node of claim 28, wherein the indication of the network type for each core network of the one or more core networks is in system information block one (SIB1) or system information block two (SIB2).

30. The network node of claim 28, wherein the network type for each core network of the one or more core networks comprises one of an enhanced packet system (EPS) core network type and a fifth generation system (5GS) core network type.

31. The network node of claim 28, wherein a core network of the one or more core networks is a 5GS core network and the system information for the core network includes parameters that have a different meaning with respect to 5GS than with respect to EPS.

32. The network node of claim 28, wherein a core network of the one or more core networks is a 5GS core network and the system information for the core network includes 5GS specific system information blocks.

33. The network node of claim 31, the processing circuitry further operable to transmit an indication that one or more information elements of the system information are to be interpreted according to 5GS.

34. The network node of claim 33, wherein the processing circuitry is operable to transmit the indication that one or more information elements are to be interpreted according to 5GS by transmitting dedicated signaling or transmitting broadcast signaling.

* * * * *